US009777458B2

(12) United States Patent
Bargellini et al.

(10) Patent No.: US 9,777,458 B2
(45) Date of Patent: Oct. 3, 2017

(54) DETACHABLE THUMB ASSEMBLY AND BACKHOE DIGGING APPARATUS COMPRISING THE SAME

(75) Inventors: Marcello Bargellini, Asheville, NC (US); Chester Harding, Ruffieux (FR); Michal Perdek, Tresserve (FR)

(73) Assignee: Volvo Compact Equipment SAS, Belley (FR)

( * ) Notice: Subject to any disclaimer, the term of this patent is extended or adjusted under 35 U.S.C. 154(b) by 268 days.

(21) Appl. No.: 13/809,414

(22) PCT Filed: Jul. 21, 2010

(86) PCT No.: PCT/IB2010/002138
§ 371 (c)(1),
(2), (4) Date: Jan. 10, 2013

(87) PCT Pub. No.: WO2012/010921
PCT Pub. Date: Jan. 26, 2012

(65) Prior Publication Data
US 2013/0115038 A1 May 9, 2013

(51) Int. Cl.
*E02F 3/413* (2006.01)
*A01G 23/06* (2006.01)
(Continued)

(52) U.S. Cl.
CPC ............ *E02F 3/413* (2013.01); *A01G 23/06* (2013.01); *B02C 13/00* (2013.01); *E02F 3/40* (2013.01); *E02F 3/404* (2013.01); *E02F 3/964* (2013.01)

(58) Field of Classification Search
CPC ......... E02F 3/404; E02F 3/413; E02F 3/4131; E02F 3/4133; E02F 3/4135; E02F 3/4136;
(Continued)

(56) References Cited

U.S. PATENT DOCUMENTS 3,688,930 A * 9/1972 Shumaker ............... E02F 3/306
414/718
3,913,768 A * 10/1975 Grooss et al. ............. 414/711
(Continued)

FOREIGN PATENT DOCUMENTS

EP 328197 A1 8/1989
EP 1580437 A1 9/2005
(Continued)

OTHER PUBLICATIONS

International Search Report (Apr. 11, 2011) for corresponding International application No. PCT/IB2010/002138.

*Primary Examiner* — Anna Momper
*Assistant Examiner* — Brendan Tighe
(74) *Attorney, Agent, or Firm* — WRB-IP LLP

(57) ABSTRACT

A detachable thumb assembly for a construction equipment machine includes a mounting bracket for attaching the thumb assembly to a digging apparatus of the machine, a thumb pivotally connected on the mounting bracket, a thumb cylinder including a cylinder body connected to the mounting bracket and a cylinder rod which extends from a front end of the cylinder body and which is connected to the thumb. The body of the thumb cylinder is pivotally connected to the mounting bracket at a connection portion of the body which is distinct from a body back end portion.

15 Claims, 6 Drawing Sheets

(51) Int. Cl.
*B02C 13/00* (2006.01)
*E02F 3/40* (2006.01)
*E02F 3/96* (2006.01)

(58) Field of Classification Search
CPC . E02F 3/962; E02F 3/963; E02F 3/965; Y10S 37/903
USPC .......... 37/404, 406, 903; 414/722, 723, 724, 414/729, 739, 741
See application file for complete search history.

(56) References Cited

U.S. PATENT DOCUMENTS

| | | | |
|---|---|---|---|
| 4,185,698 A * | 1/1980 | Frisbee | 172/33 |
| 4,375,345 A * | 3/1983 | Hanson | 414/722 |
| 5,553,408 A | 9/1996 | Townsend | |
| 5,678,332 A | 10/1997 | Hawkins | |
| 5,813,822 A | 9/1998 | Pisco | |
| 6,202,308 B1 * | 3/2001 | Ramun | 30/134 |
| 6,655,053 B1 | 12/2003 | Cummungs | |
| 7,111,419 B1 | 9/2006 | Miller | |
| 7,165,930 B2 | 1/2007 | Pisco | |
| 2003/0223852 A1* | 12/2003 | Bauer et al. | 414/724 |
| 2005/0220601 A1* | 10/2005 | Pisco | 414/723 |
| 2009/0290966 A1 | 11/2009 | King | |

FOREIGN PATENT DOCUMENTS

| | | |
|---|---|---|
| FR | 1556193 | 3/1968 |
| JP | 61068935 A | 4/1986 |
| JP | H0369795 A | 3/1991 |
| JP | 3233003 A | 10/1991 |
| JP | 10212834 A | 8/1998 |
| WO | 0210522 A1 | 2/2002 |
| WO | 2008079033 A1 | 7/2008 |

\* cited by examiner

DETACHABLE THUMB ASSEMBLY AND BACKHOE DIGGING APPARATUS COMPRISING THE SAME

BACKGROUND AND SUMMARY

The invention relates to detachable thumb assemblies for construction machines. Such detachable thumb assemblies may be attached to the backhoe digging, apparatus of machines such as excavators or backhoe loaders, where they can be used in conjunction with a main implement mounted on said digging apparatus, such as an excavating bucket or a hammer.

Many construction equipment machines are equipped with a backhoe. A backhoe is a piece of equipment where a work implement, primarily a bucket, is mounted at the end of a digging apparatus, the apparatus being itself mounted on a chassis of machine. The digging apparatus usually comprises at least a boom, which is articulated to the chassis through at least around a horizontal axis, and very often also around a vertical axis, and a dipper which is articulated at the free end of the boom around another horizontal axis. The dipper may also be articulated with respect to the boom around a vertical axis. Each of these movements is controlled by a power cylinder, usually a hydraulic cylinder, respectively a boom cylinder for controlling the movement of the boom relative to the chassis and a dipper cylinder for controlling the movement of the dipper relative to the boom. The bucket is articulated to the dipper around another horizontal axis and is controlled by another cylinder. In a backhoe, the digging apparatus can be controlled to pull back material towards the chassis of the machine.

In some cases, the dipper part of the digging, apparatus is extendible, whereby it comprises a proximal part articulated to the boom and a distal part which is slidingly connected to the proximal part so as to form a length-adjustable dipper assembly. A cylinder is in most cases provided for adjusting the relative position of the two parts of the dipper. A slide mechanism is provided for connecting the two parts of the dipper in such a way that the two parts may slide relative one to the other along a longitudinal direction but that they are otherwise rigidly connected along all other directions. Of course, the work implement of the backhoe apparatus is then connected to the forward end of the distal part of the extendible dipper assembly.

In some cases, the proximal and distal parts are arranged so that, in cross-section, the distal part is essentially received within the proximal part, which can exhibit a hollow box cross-section. When the extendible dipper assembly is in a retracted position, only a forward extremity of the distal part emerges out of the proximal part, so as to be as compact as possible, thereby maximizing the length ratio of the assembly between its fully extended and fully retracted positions.

It is also known to provide the construction equipment machine with a detachable thumb assembly to be mounted on the machine's apparatus. Such an assembly is useful for grabbing material between the main work implement and said thumb, as the thumb is used in opposition to the other fingers in the case of a human hand. While some thumb assemblies have a fixed position with respect to the apparatus, or a position which can only be adjusted during, a non-use phase of the machine, many thumb assemblies provide a controllable thumb where the position of the thumb with respect to the digging apparatus may be adjusted during a work phase of the machine. Such control is most often governed by a hydraulic cylinder which extends between the apparatus and the thumb.

Document U.S. Pat. No. 4,375,345 discloses a detachable thumb assembly mounted on a non-extendible dipper. The assembly comprises a link which is pivotally connected to a pair of mounting plates. The thumb is pivotally connected to the mounting plates around the same axis as the link, said axis being offset from the bucket pivoting axis. The mounting plates engage a bucket pivot pin and a link pivot pin in an abutting relation. Attachment of the assembly is achieved by the link which engages a lower side of the dipper through an abutment portion and through a lock bolt. The thumb cylinder is connected to the link at its back end, while its rod front end is connected to the thumb, near the free end thereof.

Document U.S. Pat. No. 7,165,930 discloses a detachable thumb assembly comprising a mounting bracket which is to be mounted on the machine's digging apparatus through two dedicated pins which engage specific brackets. The thumb is articulated on the mounting bracket around a pivoting, axis which coaxial with the bucket/apparatus articulation axis, but the two articulations are physically separate inasmuch they do not share any component. The thumb cylinder is a conventional cylinder which is connected to the mounting bracket by its back end, so that the total length of the bracket is quite important relative to the length of the dipper assembly on which it is to be mounted.

It is desirable to propose new design of a detachable thumb assembly which is compact, both in terms of the total dimensions of the thumb assembly in itself and in terms of the total dimensions of the assembly when it is attached and operative on the machine's digging apparatus.

The invention provides for a detachable thumb assembly for a construction equipment machine, comprising
- a mounting bracket for attaching the thumb assembly to a digging apparatus of the machine;
- a thumb pivotally connected on the mounting bracket;
- a thumb cylinder comprising a cylinder body connected to the mounting bracket and a cylinder rod which extends from a front end of the cylinder body and which is connected to the thumb, characterized in that the body of the thumb cylinder is pivotally connected to the mounting bracket at a connection portion of the body which is distinct from a body back end portion.

The invention also provides for a backhoe digging apparatus for a construction equipment machine, said apparatus being equipped with such a thumb assembly.

DESCRIPTION

Figure 1:
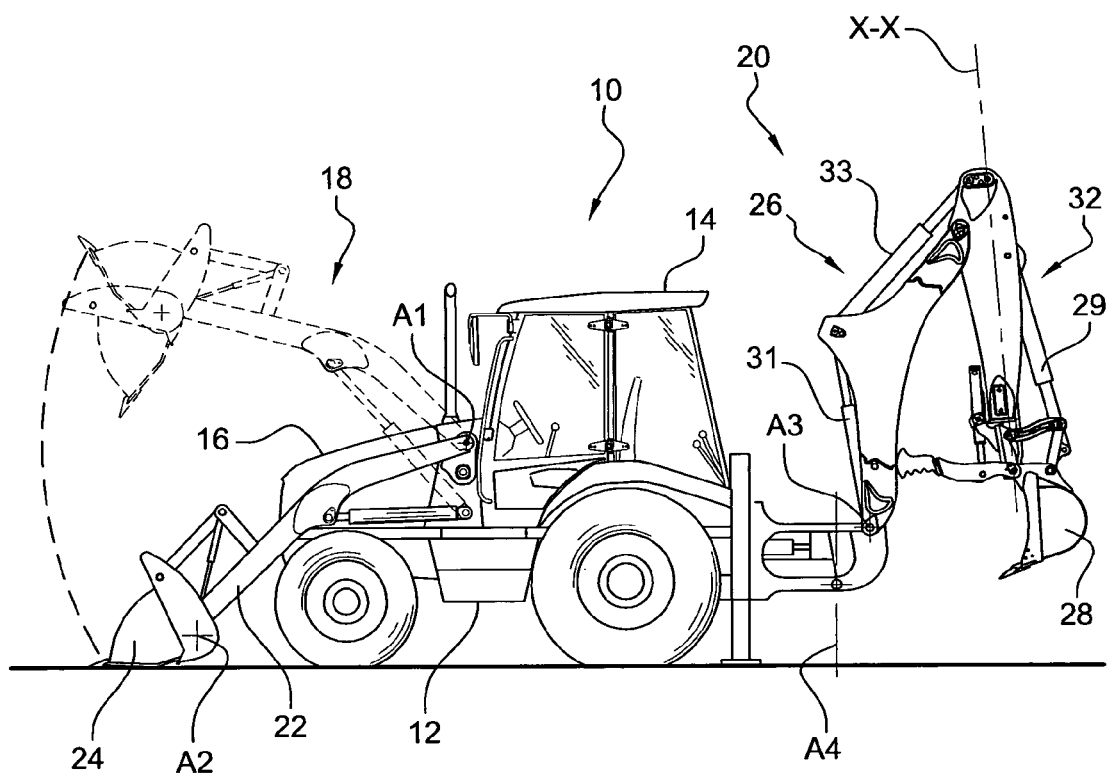
FIG. 1 is a side view of a construction equipment machine equipped with a backhoe digging apparatus on which is attached a thumb assembly according to the invention.

On FIG. 1 is shown a construction equipment machine 10 of the so-called backhoe-loader type. Such machine comprises a chassis 12 mounted on four wheels and a cabin 14 mounted on the chassis for receiving an operator of the machine. In front of the cabin 14, which encloses the machine's operating station, a bonnet 16 receives the machine's main engine. Such a machine therefore exhibits the main looks of an agricultural tractor. It derives its name from the fact that it carries two main pieces of equipment, namely a loader equipment 18 at the front, and a backhoe equipment 20 at the rear. The loader equipment 18 comprises essentially two loader arms 22 which are articulated on the chassis around a horizontal axis A1 near the rear end of the bonnet 16 and which extend longitudinally towards the front on both sides of the bonnet 16. At the free ends of the loader arms, in front of the bonnet 16, a loader bucket 24 having a generally forward facing cavity is articulated around a horizontal axis A2.

The backhoe equipment 20 comprises a backhoe digging apparatus 26 which is articulated on the chassis 12 and which carries at its free end a main work implement such as an excavator bucket 28. Of course, the apparatus 26 could be equipped with other types of main work implements, such as a hydraulic hammer. In the shown embodiment, the backhoe apparatus 26 comprises a boom 30 and an extendible dipper assembly 32. The boom 30 is articulated to the chassis around a horizontal axis A3 and around a vertical axis A4, each rotation movement being control led by at least one actuator, usually a hydraulic cylinder, such as boom cylinder 31. As better seen on FIGS. 2 to 4, the dipper assembly 32 comprises two main parts, namely a proximal part 34 which is articulated at one end around a horizontal axis A5 at the free end of the boom 30, and a distal part 36 which is slidingly connected to the proximal part 34 so as to extend along a lengthwise axis X-X beyond the free end of the proximal part 34. Movement of the dipper assembly 32 around axis A5 is controlled by an actuator, such as the dipper cylinder 33. The two parts 34, 36 of the dipper assembly are connected by an actuator, not shown on the drawings but usually embodied as a hydraulic cylinder, to expand or retract the distal part with respect to the proximal part, thereby adjusting the length of the dipper assembly 32, as can be seen by comparing FIGS. 3 and 4. The excavator bucket 28 is articulated at the free end 40 of the distal part 34 around a horizontal axis A6, which can be materialized by a pivot pin, and the bucket's movements around axis A6 are controlled by an actuator such as the hydraulic implement cylinder 29.

The proximal part 34 of the dipper assembly 32 is for example a fabricated steel sheet structure which extends along the lengthwise axis X-X of the dipper assembly and which exhibits approximately the shape of a U when viewed in cross section, the U shape enclosing partially an inner space which is open towards its top, at least along a substantial portion of the proximal part 34. The distal part 36 is at least partially received within the inner space of the proximal part 34, both lengthwise and in cross section. In any case, at least in an extended configuration, the free end 40 of the distal part 36 extends lengthwise beyond the free end 42 of the proximal part 34, outside of its inner space.

The bucket 28 is controlled by an implement cylinder through a link mechanism 35. In the shown embodiment, the hulk mechanism is a so-called "progressive" link mechanism having two mutually articulated levers 37, 39, or more precisely, in this embodiment, two mutually articulated pairs of levers. A first pair of link levers 37 is pivotally connected to the dipper assembly 32 by a first extremity around an axis A8, for example by a first lever pivot pin 41. A second pair of link levers 39 is articulated on the main work implement by a first extremity around an axis A9. The two pairs of levers 37, 39 are mutually articulated by their second extremities, around an axis A10, thanks to a mutual pivot pin 43. The implement cylinder 29 is articulated by a back end on the distal part of the dipper assembly, and its rod is articulated on the mutual pivot pin 43. The link mechanism 35 could be somewhat different, and could for example comprise only one of each first and second levers.

A backhoe loader such as the one described above is well known to the skilled man in the art and is for example commercially available as "Volvo BL 71".

On the figures is further shown a detachable thumb assembly 46 according to an exemplary embodiment of the invention, which can be attached to a backhoe digging apparatus such as described above.

The thumb assembly 46 comprises
a mounting bracket 48 for attaching the thumb assembly to the digging apparatus of the construction equipment machine;
a thumb 50, which is pivotally connected on the mounting bracket 48 around an articulation axis A6';
a thumb cylinder 52 which extends between the mounting bracket 48 and the thumb 50 to control the position of the thumb with respect to the machine's digging apparatus 26 during a work operation. Such thumb assembly 46 can be deemed as an active thumb, contrary to assemblies comprising a passive thumb where the thumb occupies a fixed position with respect to the apparatus during a work operation. Such passive thumbs may have an adjustable position with respect to the apparatus, but the adjustment of the position is necessarily made while the machine is at rest. The thumb cylinder 52 comprises a cylinder body 54 which is connected to the mounting bracket 48 and a cylinder rod 56 which extends from a front end 58 of the cylinder body 54 and which is pivotally connected to the thumb 50 around a pivot axis A7.

Figure 2:
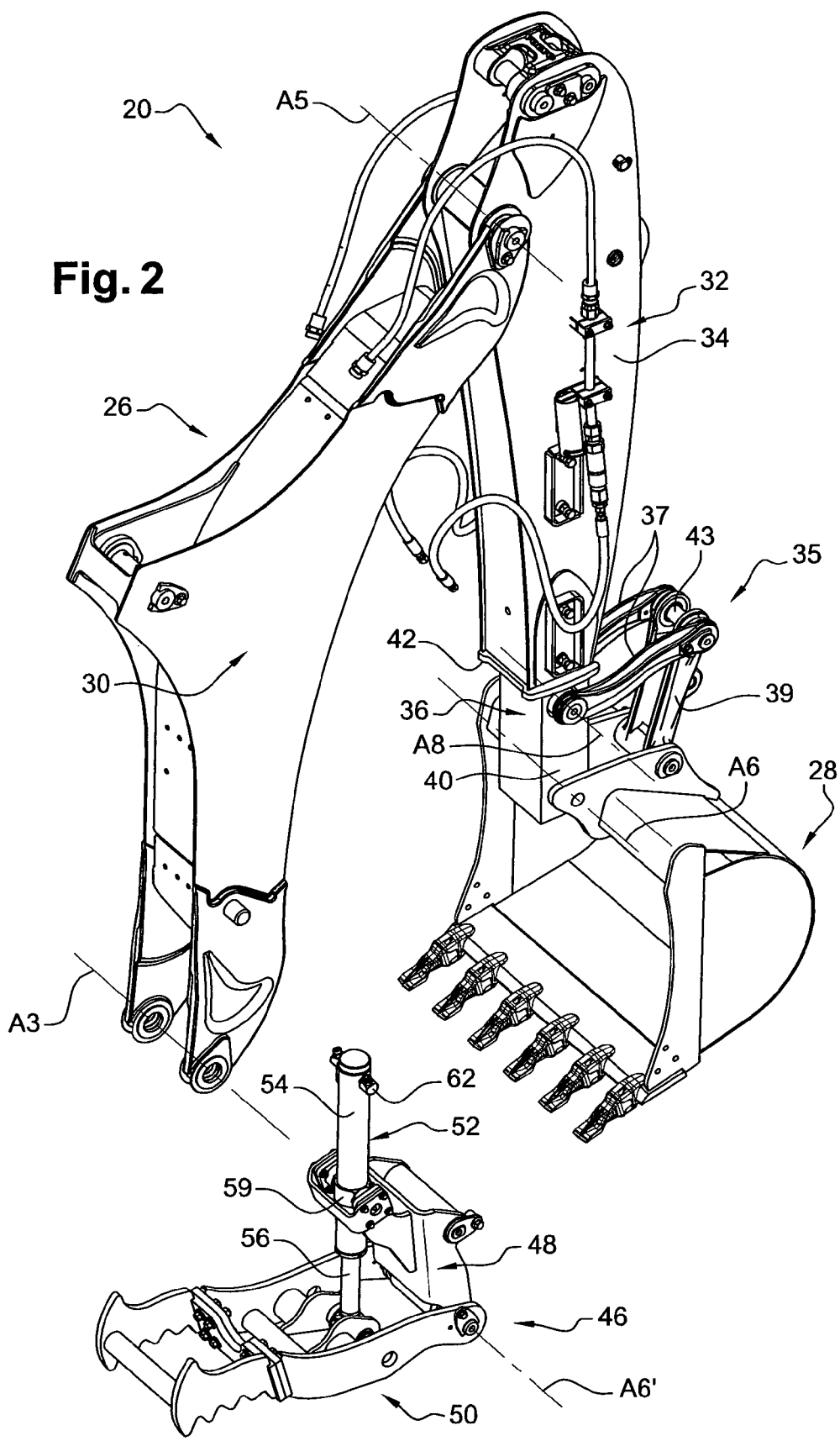
FIG. 2 is a perspective view of a backhoe digging apparatus and of a detachable thumb assembly according to the invention, the thumb assembly being detached from the apparatus.
Figure 3:
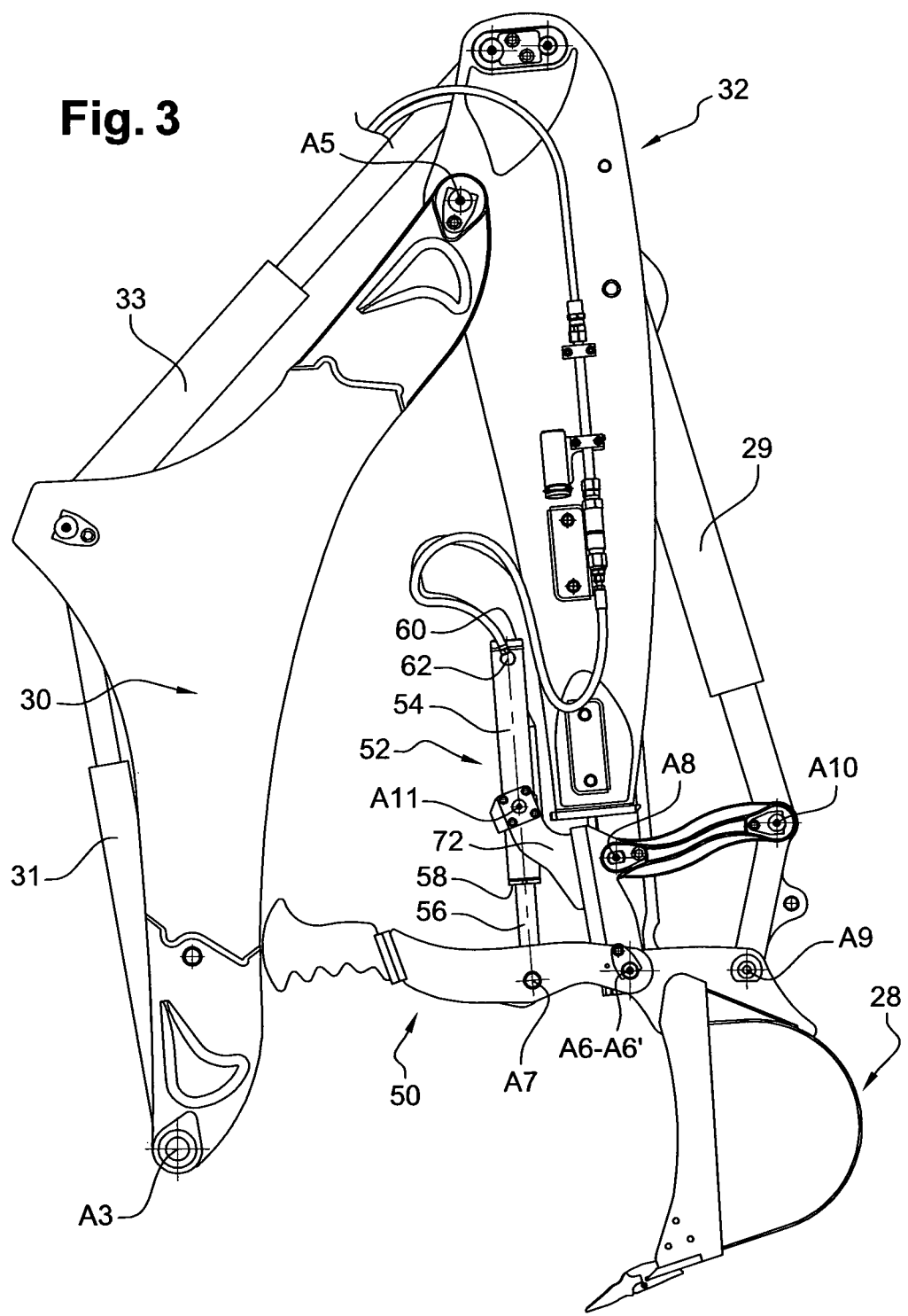
FIG. 3 is a side view of the backhoe apparatus of FIG. 2, with the thumb assembly attached.
Figure 4:
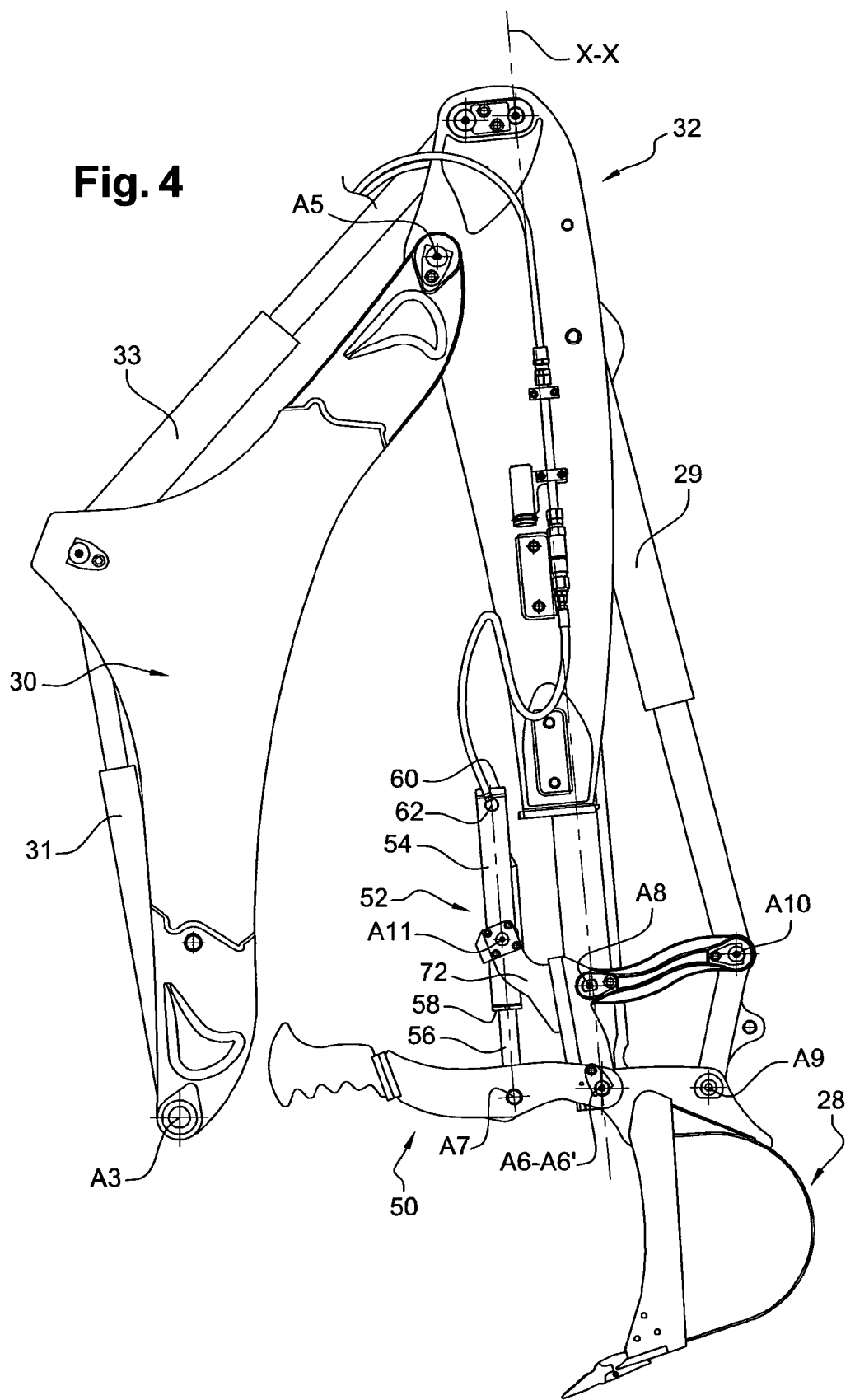
FIG. 4 is a view similar to that of the FIG. 3, where the backhoe apparatus is represented with its dipper assembly represented in an extended configuration, rather than in a retracted configuration as in FIG. 3.
Figure 6:
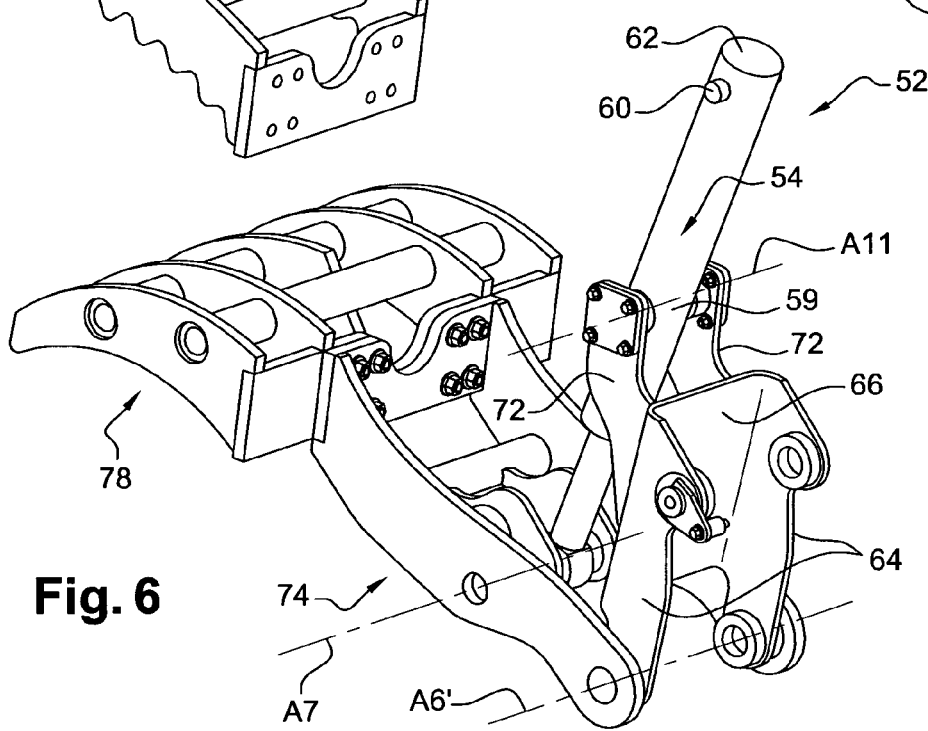
FIG. 6 is a perspective view of the thumb assembly and of a replacement end part of the thumb

According to an aspect of the invention, the thumb cylinder 52 is a so-called "trunnion" cylinder or is mounted as such, in that the cylinder body 54 is connected to the mounting bracket 48 at a connection portion 59 of the body 54 which is distinct from a body back end portion 60. Preferably, as shown in FIGS. 2, 3 and 6, the cylinder body is mounted to bracket 48 through a pivot connection around an axis A11. In the shown embodiment, this cylinder body pivot axis A11 is perpendicular to, and intersects, the longitudinal axis of the cylinder 52, although both axes could also be offset. The back end 60 of the cylinder body may comprise connecting means 62 for hydraulically connecting the thumb cylinder 52 to a hydraulic circuit of the machine which is preferably configured so as to allow the user of the machine to control the extension and retraction of the thumb from the machine's operating station.

The use of a "trunnion" cylinder 52 allows having a much more compact mounting bracket 48 than would be necessary with a conventional cylinder. In the shown embodiment, to maximize this advantage, the connection location 59 of the cylinder body 54 to the mounting bracket 48 is located in the second half of the body length from the body back end portion 60, in other words, the connection location 59, as defined by its rotation axis A11, is closer the cylinder body front end 58 than to the back end 60.

The pivot connection between the thumb and its bracket, between the cylinder rod and the thumb and/or between the cylinder body and the bracket shall be understood either as providing a pure rotational movement, such as provided by a pivot pin, or as providing a combined rotational movement, for example where a rotational movement is combined with another rotational movement, around a different axis of rotation, or is combined with a translation. Such combined movements are usually provided through multiple linkage mechanisms.

When the thumb assembly 46 is mounted on the apparatus, the cylinder pivot axis A11 is offset laterally compared to the dipper assembly, including compared to the proximal part 34. Basically, the thumb assembly 46 is mounted on the dipper assembly on the opposite side of the link mechanism 35 with respect to the dipper lengthwise axis X-X. In other words, the thumb assembly is attached on a lower side of the dipper assembly 32, while the link mechanism 35 extends on an upper side of the dipper.

Figure 7:
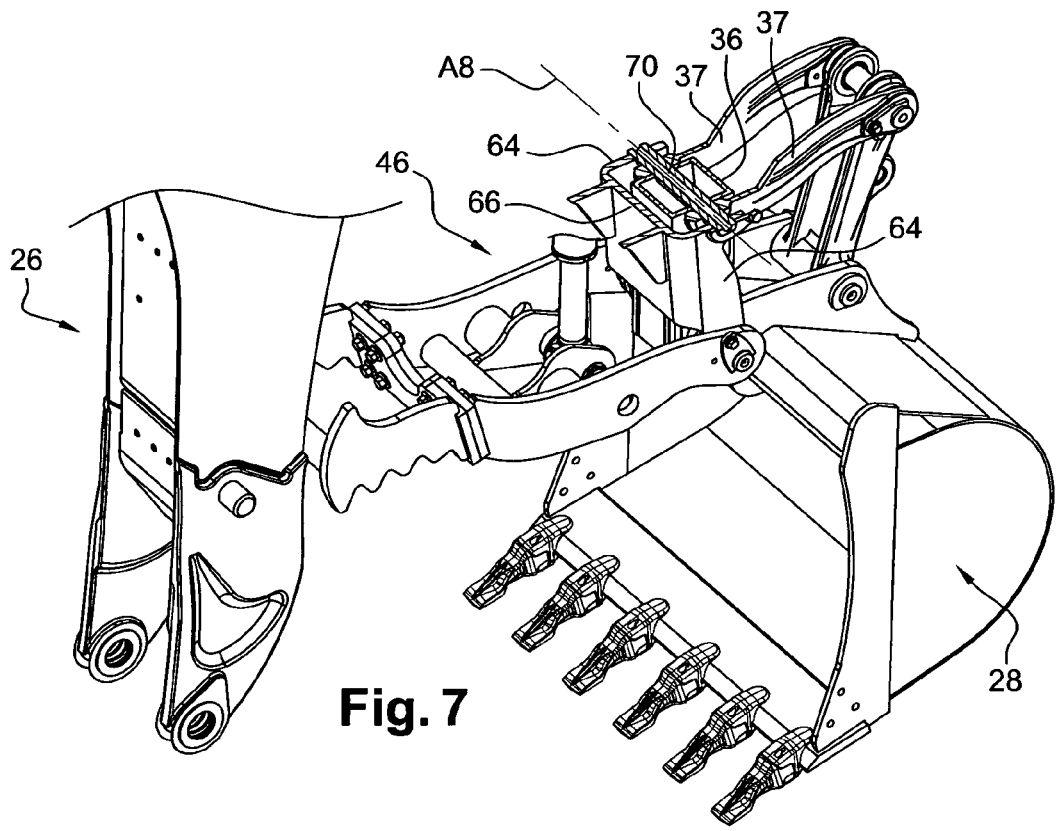
FIGS. 7 and 8 are perspective views with cut-outs along the two pivot pins by which the thumb assembly may be mounted on the digging apparatus.
Figure 8:
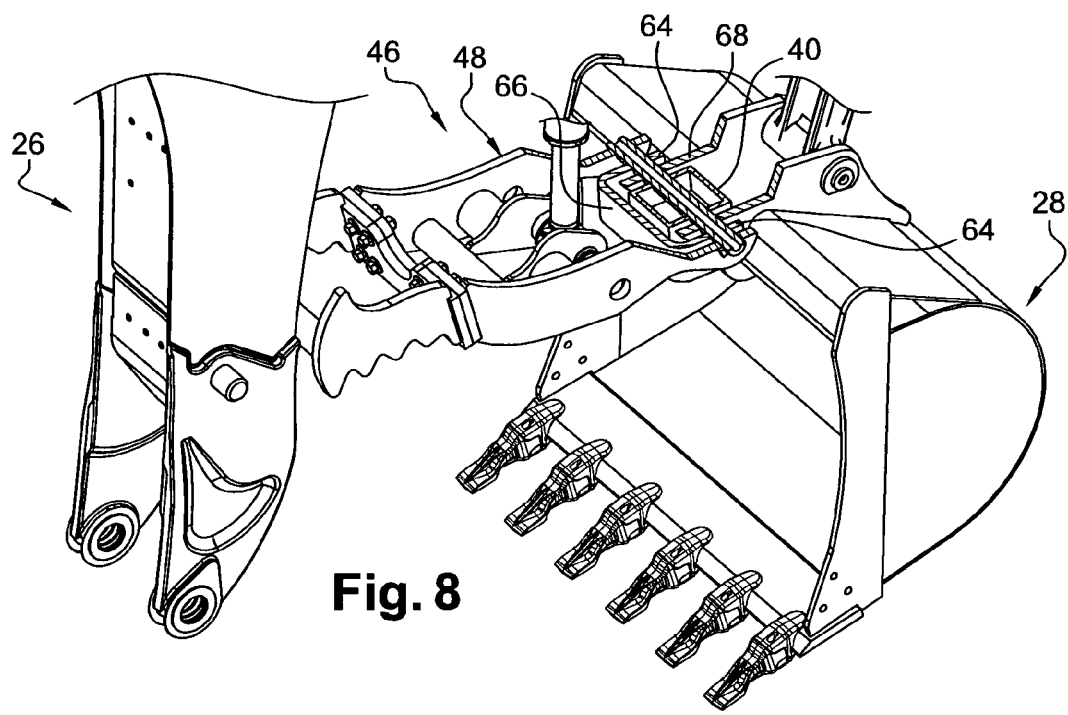

The mounting bracket 48 can be attached to the digging apparatus in various manners. While the bracket could be mounted on dedicated attaching location provided on the dipper assembly, it appears to be advantageous to provide that the bracket is attached to the dipper by engaging the pivot connections of said first link levers 37 and of the implement 28, or at least one of them. In FIGS. 6, 7 and 8 is shown that the mounting bracket 48 may comprise a U shaped base having two parallel flanges 64 connected by a plate 66 which are designed to surround the free end 40 of the distal portion 36 of the dipper assembly 32. This U shaped base is intended to be located with its plate 66 parallel to both axis A6 and A8, facing the lower side of the dipper assembly, while the flanges 64 are perpendicular to those axis. Not only the end of portion 40 of the dipper, but also the first extremities of the first link levers 37 and the bucket pivot portion are to be received with the space defined by the two parallel flanges 64, as shown in FIGS. 7 and 8. In the example shown, the bucket and the first link lever pivot connections are in the form comprising respectively a pivot pin 68, 70. Advantageously, those pivot pins are to be used for attaching the mounting bracket to the dipper assembly. For example, the flanges 64 may be provided with two pairs of cylindrical holes. A first pair of holes, one in each flange 64, is to be aligned with the pivot axis A6 of the bucket 28 on the apparatus 26, and is to be engaged by the pivot pin 68 which also serves as the pivot pin for the connection of the bucket 28 to the dipper assembly. A second pair of holes, one in each flange, is to be aligned with the pivot axis A8 of the first link levers 37 on the apparatus and is to be engaged by the pivot pin 70 which also serves as the pivot pin for the connection of the first link levers 37 to the dipper assembly. Therefore, in this embodiment, the attachment of the thumb assembly is provided exclusively by engagement of the mounting bracket with the pivot connections of the work implement and of the first link lever.

Such use of the pivot connections of the first lever and/or of the bucket on the dipper assembly, for attaching the thumb assembly on the apparatus, removes the obligation to provide dedicated attaching locations on the dipper. Moreover, the pivot locations are usually designed to bear high forces and are therefore ideal for also bearing the forces acting on the thumb assembly, without needing additional reinforcement. Of course, the various pivot connections which are discussed could be embodied according to any conventional form known to the man in the art, and are such not limited to pivot pin connections.

According to another feature of the shown embodiment, the thumb 50 is articulated on the mounting bracket 46 around an axis A6 which, when the assembly 46 is mounted on the dipper 32, is coaxial with the axis A6 of the pivot connection between the bucket 28 and the dipper 32. Furthermore, as it has been seen that the mounting bracket can be attached to the dipper 32 via the pivot connection of the bucket 28 on the dipper 32, such as pivot pin 68, it appears to be advantageous that the same pivot pin is also used as a pivot connection for the thumb on the mounting bracket, as shown on FIG. 8. Therefore a single common pivot pin 68 can be provided for pivotally connecting the thumb 50 on the mounting bracket 48, for attaching the thumb assembly 46 on the digging apparatus 26 of the machine, and for providing a pivotal connection of the work implement 28 on the machine's apparatus 26. Nevertheless, a separate pivot connection could be provided for connecting the thumb 50 to the mounting bracket 48 around axis A6'. In such a case, it could still be provided to use the pivot, connection of the bucket 28, such as pin 68, as an attaching element for the thumb assembly.

In the shown embodiment, when the thumb assembly 46 is mounted on the dipper assembly 32, the cylinder pivot axis A11 is offset laterally compared to the dipper assembly, including compared to the proximal part 34. To achieve this, the mounting bracket 48 comprises a pair of secondary flanges 72 which extend both perpendicularly from the plate 66, in the opposite direction compared to flanges 64, away from the dipper assembly. The cylinder 52 is received and articulated around axis A11 between the free ends of these two parallel secondary flanges 72. In the shown embodiment, these secondary flanges 72 also extend longitudinally rearwardly with respect to the dipper assembly, i.e. towards its rotation axis A5 on the boom 30, and exhibit an L shape, so as not to interfere with the proximal part of the dipper assembly when it is in its most retracted configuration. Indeed, in that configuration, it can be seen on FIG. 3 that the pivot connection A11 of the cylinder body 54 is located rearwards of the front 42 end of the proximal part 34.

The shown embodiment exhibits a number of features which have been specially defined to keep the thumb assembly as compact as possible, while nevertheless allowing the thumb to be pivoted by approximately 120 degrees between its extreme positions.

According to one feature, the thumb cylinder rod 56 is connected to the thumb 50, here by a simple pivot connection around axis A7, at a connection location of the thumb 50 which is preferably located in the first half of the thumb length from its pivot connection on the mounting bracket. In other words, axis A7 is closer to the thumb's axis of rotation A6' on the mounting bracket than to the thumb's free end. To give an order of magnitude, the distance between the rod/thumb connection axis A7 and the thumb/mounting bracket pivot axis A6', which can be called the thumb control radius, is preferably less than 100 percent, and more preferably less than two thirds of the distance from the cylinder body/mounting, bracket pivot axis A11 to the thumb/mounting bracket pivot axis A6', which can be called the bracket diagonal. This feature has the advantage that, as shown on the figures, a two part thumb can be used, where different end parts of the thumb, with possibly different shapes, can be attached to a same base part. Indeed, as best shown on FIG. 6, the thumb 50 may comprise a base part 74 by which it is pivotally connected to the mounting bracket 48 and which comprises the connection location where the cylinder rod is connected to the thumb, and an end part 76, 78 which is detachably connected to the base part 74. With such design of the thumb, not only can the end part 76 of the thumb be replaced if it gets worn or broken, but the end part 76 can be replaced by an end part 78 of different shape adapted to a particular work operation to be carried out. This replacement can be performed without removing the thumb assembly 46 from the dipper and without disconnecting an pivot connection.

On the other hand, the thumb control radius must not be too small, so as to limit the linear force which the thumb cylinder 52 needs to generate to deliver a given torque on the thumb 50 relative to the thumb pivot axis A6'.

According to a further feature of the thumb assembly, the distance between the rod/thumb connection axis A7 and the thumb/mounting bracket pivot axis A6', i.e. the thumb control radius, is within 80 and 120 percent of the shortest distance from cylinder body/mounting bracket pivot axis A11 to the plane defined by the implement and link lever pivot axis, respectively A6 and A8, which can be called the bracket offset. Thanks to this feature, the hydraulic cylinder remains substantially parallel to the dipper assembly, which avoids any contact of the back end 60 of the cylinder with the dipper assembly, despite the cylinder offset being quite small, i.e. just sufficient to avoid interaction with the proximal part of the dipper assembly in the fully retracted configuration of the dipper. Moreover, this feature further enhances the limited bracket offset in limiting the risk of the cylinder colliding with external objects, because the cylinder always remains close to the dipper assembly.

Also remarkable is the feature that the distance between the rod/thumb connection axis A7 and the thumb/mounting bracket pivot axis A6', herein called thumb control radius, is less than 120 percent of the shortest distance from cylinder body/mounting bracket pivot axis A11 to the plane defined by the implement and link lever pivot axis A6, A8, herein called bracket offset. This feature contributes to minimizing the angle by which the cylinder moves around its axis A11 when the thumb is controlled from an extreme position to another. Minimizing this angle also allows minimizing the bracket offset, with the advantage mentioned earlier of limiting the risk of the cylinder colliding with external objects.

On the other hand, the distance from the cylinder body/mounting, bracket pivot axis A11 to the thumb/mounting bracket pivot axis A6', herein called bracket diagonal, is preferably less than three times, and more preferably not more than approximately twice the distance between the rod/thumb connection axis A7 and the thumb/mounting, bracket pivot axis A6', herein called thumb control radius, in order to maximize the compactness of the mourning bracket, lengthwise.

Figure 5:
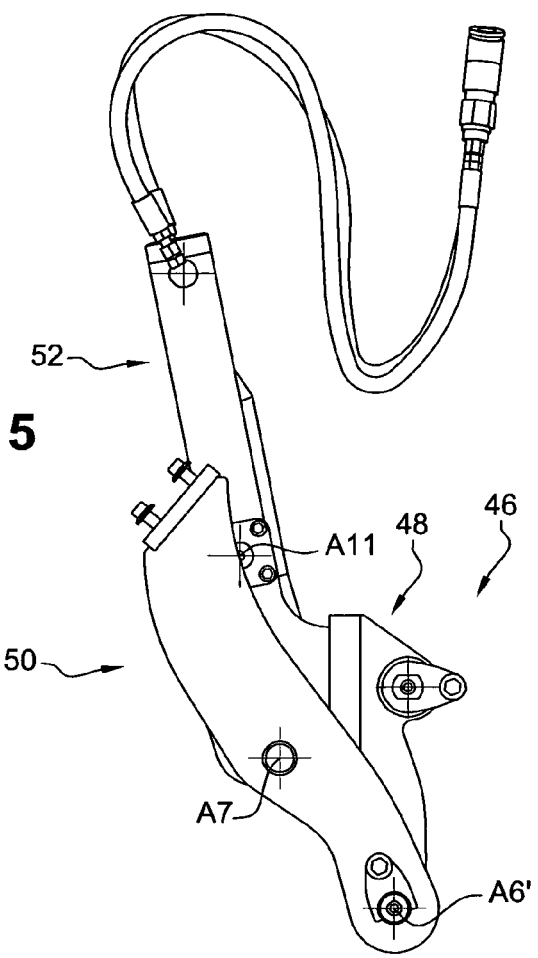
FIG. 5 is a side view showing an extreme position of the thumb assembly according to the invention.

According to a further feature of the thumb assembly, which is apparent on FIG. 5 (on which only the base part 70 of the thumb 50 is shown, without any end part), the shortest cylinder front length, which is the distance between the cylinder body/mounting bracket pivot axis A11 and the thumb/rod pivot axis A7 when the cylinder 52 is fully retracted, is less than 100 percent, and preferably less than two thirds, of the distance from the cylinder body/mounting bracket A11 pivot axis to the thumb/mounting bracket pivot axis A6', herein called bracket diagonal. Having such a low ratio without compromising the total angular travel of the thumb between its extreme positions is possible thanks to the use of a trunnion cylinder.

In the shown embodiment, the thumb assembly 46 combines all the features above and has approximately the following dimensions, which are given in a relative format where the bracket diagonal is arbitrarily given the value 100:

| | |
|---|---|
| Bracket diagonal (A11 to A6) | 100 |
| Thumb control radius (A6 to A7) | 50 |
| Bracket offset (A11 to X-X) | 45 |
| Minimum cylinder front length (A11 to A7) | 55 |
| Cylinder rear length (A11 to rear end 60) | 92 |
| Angular travel of thumb between extreme positions) | Approximately 120 degrees |

The invention has been described in the context of a backhoe digging apparatus to be mounted on a backhoe-loader, but it would obviously be applicable in any type of backhoe apparatus, for example for use on an excavator.

The invention claimed is:

1. Detachable thumb assembly for a construction equipment machine, comprising
   a mounting bracket for attaching the thumb assembly to a digging apparatus of the machine;
   a thumb pivotally connected on the mounting bracket; and
   a thumb cylinder comprising a thumb cylinder body connected to the mounting bracket at a connection location and a cylinder rod which extends from a front end of the thumb cylinder body and which is connected to the thumb;
   wherein the mounting bracket comprises two pairs of cylindrical holes that engage and surround two pivots by which a work implement and a link lever for the work implement are pivoted on the machine apparatus, and
   wherein one of the two pivots is a single common pivot that pivotally connects the thumb on the mounting bracket, pivotally connects the thumb assembly on the digging apparatus of the machine, and pivotally connects the work implement on the digging apparatus of the machine.

2. Detachable thumb assembly according to claim 1, wherein the thumb has a length including a first half of the thumb closest to a pivot connection of the thumb and the mounting bracket and a second half of the thumb further from the pivot connection of the thumb and the mounting bracket than the first half of the thumb, and the thumb cylinder rod is pivotally connected to the thumb at a cylinder rod connection location of the thumb which is located in the first half of the thumb.

3. Detachable thumb assembly according to claim 1, wherein a distance between a cylinder rod/thumb connection axis and a thumb/mounting bracket pivot axis is less than 100 percent of a distance from a thumb cylinder body/mounting bracket pivot axis to the thumb/mounting bracket pivot axis.

4. Detachable thumb assembly according to claim 1, wherein a distance from a thumb cylinder body/mounting bracket pivot axis to a thumb/mounting bracket pivot axis is less than three times a distance between a rod/ thumb connection axis and the thumb/mounting bracket pivot axis.

5. Detachable thumb assembly according to claim 1, wherein a shortest cylinder from length, the shortest cylinder front length being a distance between a thumb cylinder body/mounting bracket pivot axis and a thumb/cylinder rod pivot axis when the cylinder rod is fully retracted into the cylinder, is less than 100 percent of a distance from a thumb cylinder body/mounting bracket pivot axis to the thumb/mounting bracket pivot axis.

6. Detachable thumb assembly according to claim 1, wherein a distance between a rod/thumb connection axis and a thumb/mounting bracket pivot axis is less than 120 percent of a shortest distance from a thumb cylinder body/mounting bracket pivot axis to a plane defined by an implement and link lever pivot axis.

7. Detachable thumb assembly according to claim 1, wherein the thumb assembly is attached by the two pivots at the free end of a distal part of an extendible dipper assembly which slides longitudinally with respect to a proximal part of the extendible dipper assembly, without limiting an extension/retraction capacity of the extendible dipper assembly.

8. Detachable thumb assembly according to claim 1, wherein the thumb comprises a base part by which the thumb is pivotally connected to the mounting bracket, the base part comprising a connection location where the cylinder rod is connected to the thumb, and an end pan which is detachably connected to the base part.

9. Detachable thumb assembly according to claim 1, wherein the lot ting bracket comprises two parallel flanges which comprise two pairs of aligned cylindrical holes for axially receiving, respectively, an implement pivot pin and a link lever pivot pin.

10. Backhoe digging apparatus for a construction equipment machine, wherein the digging apparatus comprises
a boom to be attached to the machine;
an extendable dipper articulated at the free end of the boom;
a main work implement which is pivotally connected by an implement pivot to the end of the extendable dipper and which is controlled by an implement cylinder through a link mechanism having two mutually articulated levers, a first one of which is pivotally connected to the extendable dipper by a first lever pivot and a second one of which is articulated on the main work implement,
wherein the backhoe digging apparatus comprises a thumb assembly according to claim 1.

11. Backhoe digging apparatus according to claim 10, comprising an extendable dipper, the extendable dipper comprising a proximal part articulated at a free end of the boom and a distal part which can slide longitudinally with respect to the proximal part, a front end of the extendable dipper being part of the distal part, and the implement pivot and the first lever pivot engage the distal part of the extendible dipper assembly.

12. Backhoe digging apparatus according to claim 10, wherein the thumb has a length including a first half of the thumb closest to a pivot connection of the thumb and the mounting bracket and a second half of the thumb further from the pivot connection of the thumb and the mounting bracket than the first half of the thumb, and the thumb cylinder rod is pivotally connected to the thumb at a cylinder rod connection location of the thumb which is located in the first half of the thumb length.

13. Detachable thumb assembly according to claim 10, wherein a distance between a cylinder rod/thumb connection axis and a thumb/mounting bracket pivot axis is less than 100 percent of a distance from a thumb cylinder body/mounting bracket pivot axis to the thumb/mounting bracket pivot axis.

14. Detachable thumb assembly according to claim 10, wherein a distance from a thumb cylinder body/mounting bracket pivot axis to a thumb/mounting bracket pivot axis is less than three times a distance between a rod/thumb connection axis and the thumb/mounting bracket pivot axis.

15. Detachable thumb assembly for a construction equipment machine, comprising
a mounting bracket for attaching the thumb assembly to a digging apparatus of the machine;
a thumb pivotally connected on the mourning bracket; and
a thumb cylinder comprising a thumb cylinder body connected to the mounting bracket at a connection location that is disposed rearward of the front end of the extendable dipper when the extendable dipper is in a retracted position and a cylinder rod which extends from a front end of the thumb cylinder body and which is connected to the thumb;
wherein the mounting bracket comprises two pairs of cylindrical holes that engage and surround two pivots by which a work implement and a link lever are pivoted on the machine apparatus, and
wherein one of the two pivots is a single common pivot that pivotally connects the thumb on the mounting bracket, that pivotally connects the thumb assembly on the digging apparatus of the machine, and that pivotally connects the work implement on the digging apparatus of the machine.

* * * * *